Figure 1:
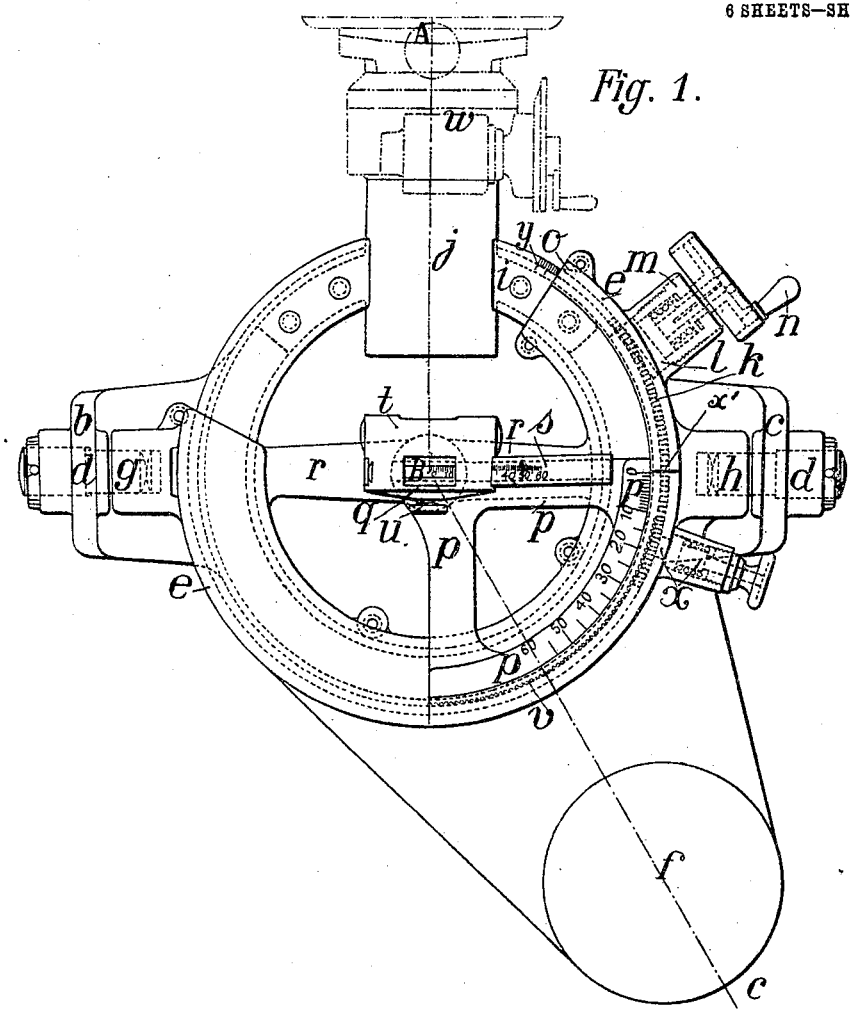

No. 799,093. PATENTED SEPT. 12, 1905.
C. P. E. SCHNEIDER.
SIGHTING APPARATUS FOR GUNS.
APPLICATION FILED SEPT. 19, 1902.

6 SHEETS—SHEET 1.

Witnesses:
Wm. B. Kerkam
Gustave R. Thompson

Inventor:
Charles P. E. Schneider
by Philip Mauro
atty

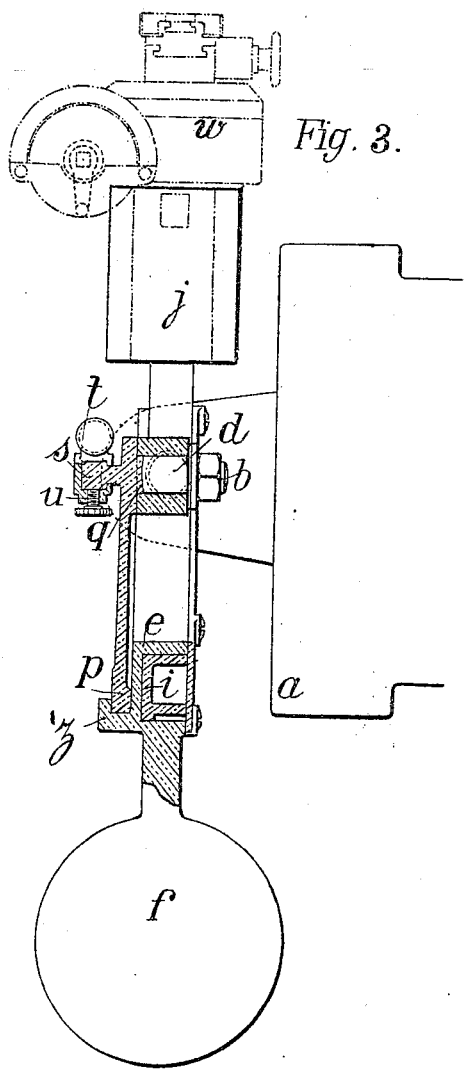

No. 799,093. PATENTED SEPT. 12, 1905.
C. P. E. SCHNEIDER.
SIGHTING APPARATUS FOR GUNS.
APPLICATION FILED SEPT. 19, 1902.

6 SHEETS—SHEET 3.

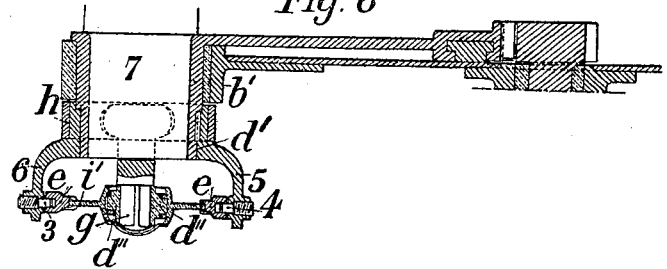
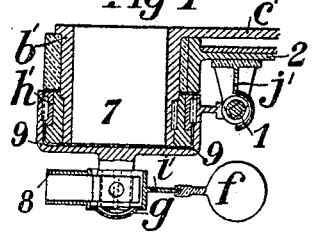

No. 799,093. PATENTED SEPT. 12, 1905.
C. P. E. SCHNEIDER.
SIGHTING APPARATUS FOR GUNS.
APPLICATION FILED SEPT. 19, 1902.

6 SHEETS—SHEET 5.

Witnesses:
Wm. B. Kerkam
Gustave R. Thompson

Inventor:
Charles P. E. Schneider,
by Philip Mauro
Atty.

No. 799,093. PATENTED SEPT. 12, 1905.
C. P. E. SCHNEIDER.
SIGHTING APPARATUS FOR GUNS.
APPLICATION FILED SEPT. 19, 1902.
6 SHEETS—SHEET 6.
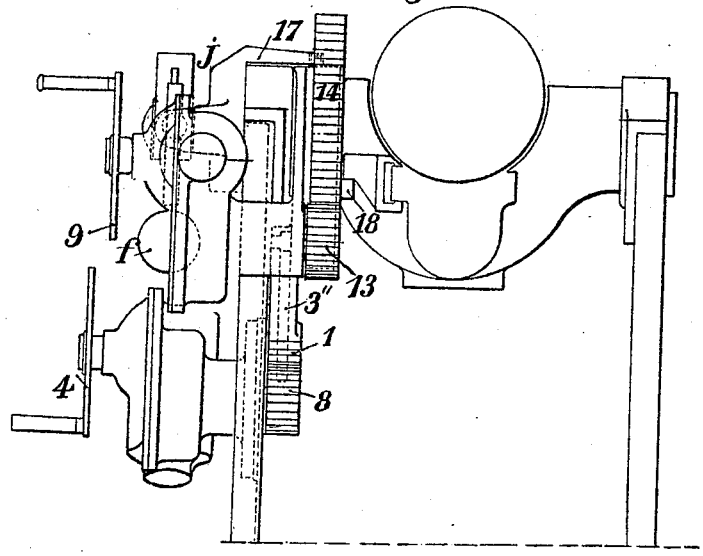
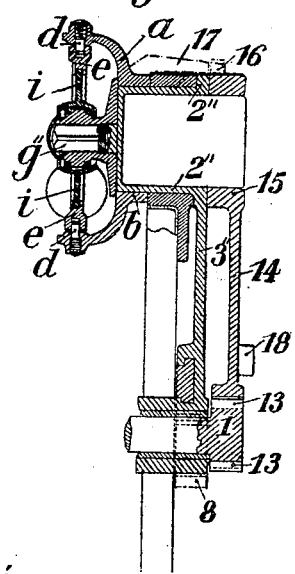
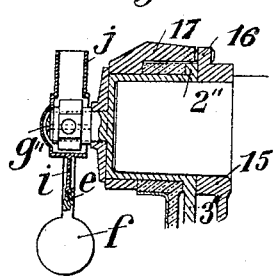

UNITED STATES PATENT OFFICE.

CHARLES PROSPER EUGÈNE SCHNEIDER, OF LE CREUZOT, FRANCE.

SIGHTING APPARATUS FOR GUNS.

No. 799,093.  Specification of Letters Patent.  Patented Sept. 12, 1905.

Application filed September 19, 1902. Serial No. 124,069.

*To all whom it may concern:*

Be it known that I, CHARLES PROSPER EUGÈNE SCHNEIDER, residing at Le Creuzot, Saône-et-Loire, in the Republic of France, have invented certain new and useful Improvements Relating to Sighting Apparatus for Guns, of which the following is a full, clear, and exact specification.

This invention has reference to apparatus for automatically compensating for variations in the inclination of the trunnion-axis of ordnance, especially howitzers used for either seige or garrison purposes.

It is generally known that in order to allow for and correct the deviation of the projectile in firing ordnance it is necessary to bring the vertical plane of the axis of the gun to a certain angle (known as the "deviation" or "drift") in relation to the vertical plane of the line of sight when such line is directed toward the target. Given this angle, in the case of a predetermined target it is important that such angle should remain constant no matter how many times that target may be fired at. Now what happens in most cases is that by reason of the vibration to which the ground (the resisting power of which is generally more or less insufficient) is subjected in firing and also of the direct effect of the firing the axis of the trunnions when the gun is fired a number of times in succession alters its angle of inclination at each discharge, with the result that as the sighting instruments are stationary on the gun the deviation instead of remaining constant varies every time the gun is fired.

In my United States Patent No. 728,990, of May 26, 1903, there is described compensating apparatus which is particularly applicable to naval guns, the effect of such apparatus being to automatically maintain a given invariable deviation at whatever angle the axis of the trunnions may happen to be. In such arrangement the sighting apparatus proper is transferred to a support provided with a counterpoise-weight capable of oscillating on a pivot or spindle which is adjusted (and subsequently remains of its own accord) parallel to the axis of the gun. This pendulous support of the sighting apparatus is always automatically restored to a vertical plane, while the axis of oscillation of such support invariably remains parallel to the axis of the gun.

The apparatus for automatically compensating for the angle of inclination of the axis of the trunnions forming the subject of this invention is constructed on a similar principle to that above referred to, but is characterized by the special construction of the pendulous support of the sighting apparatus proper and the disposition of the axis or pivot on which the said support oscillates. These features permit, moreover, as I shall show farther on, the automatic compensating device to be readily combined either with training mechanism with an independent line of sight or with training mechanism having an independent range-indicator.

The principle of the novel automatic compensator is embodied in a pendulous support having the shape of a circular frame provided with a weight, which frame forms a guide for a movable circular support forming part of the sighting apparatus proper, the said frame being pivotally mounted upon pins or studs projecting from a bracket which may form part of the gun itself or (owing to its position upon one of the gun-trunnions) be connected to training mechanism having either an independent line of sight or an independent range-indicator.

In the accompanying drawings I have shown by way of example three forms in which the invention may be carried into practice.

Figure 2:
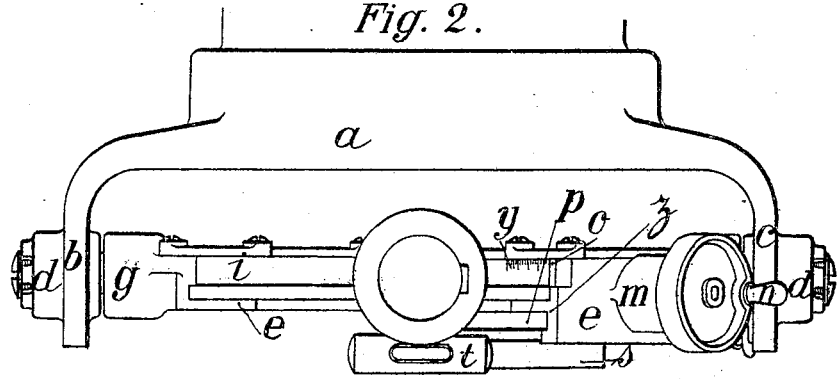
Figure 1:
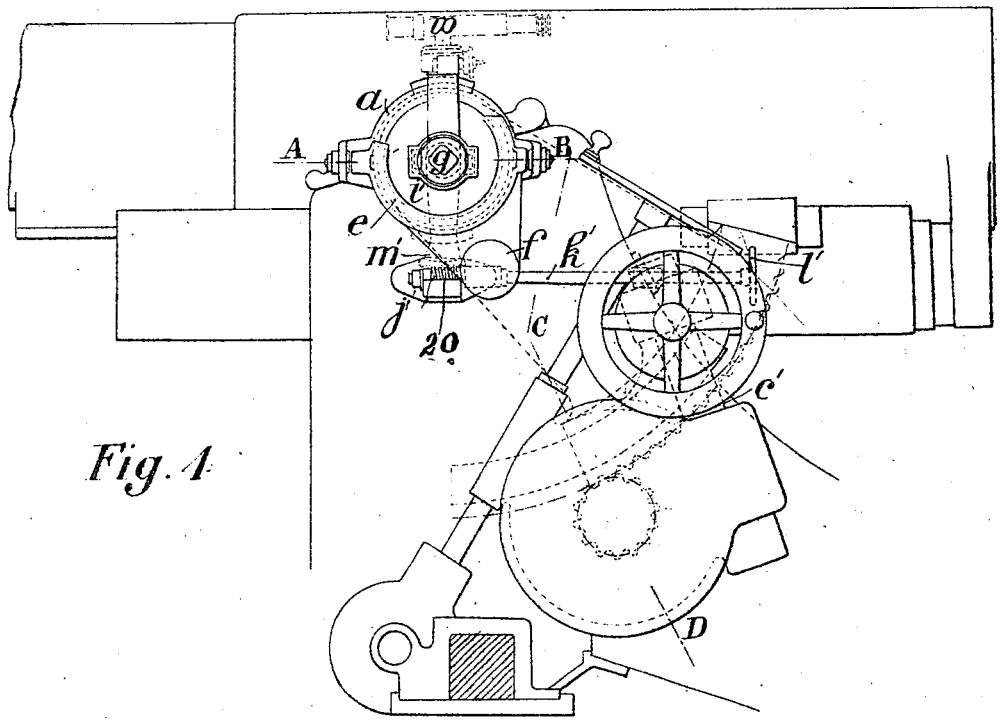
Figure 5:
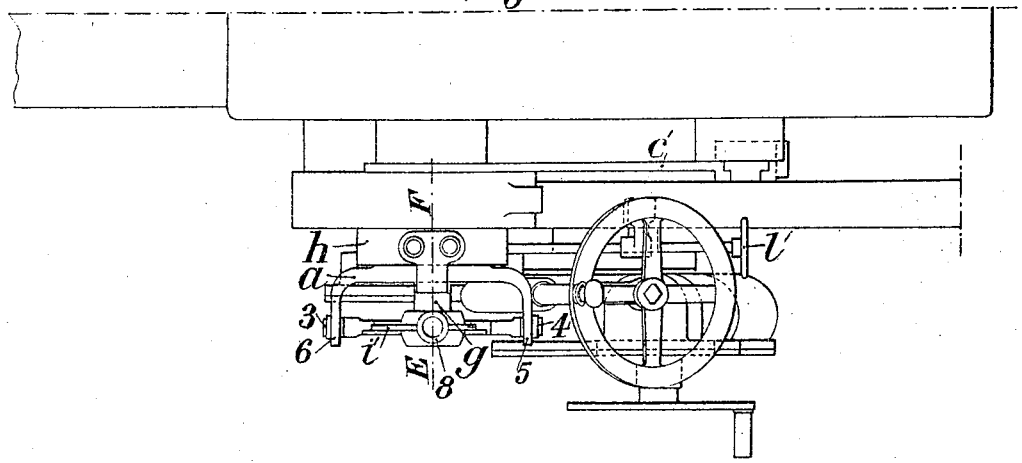
Figure 8:
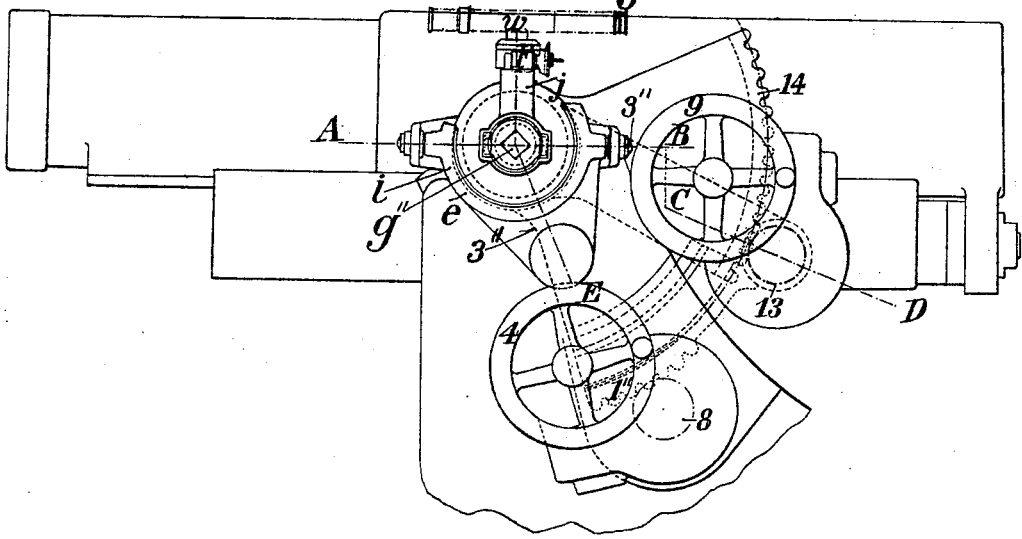
Figure 9:
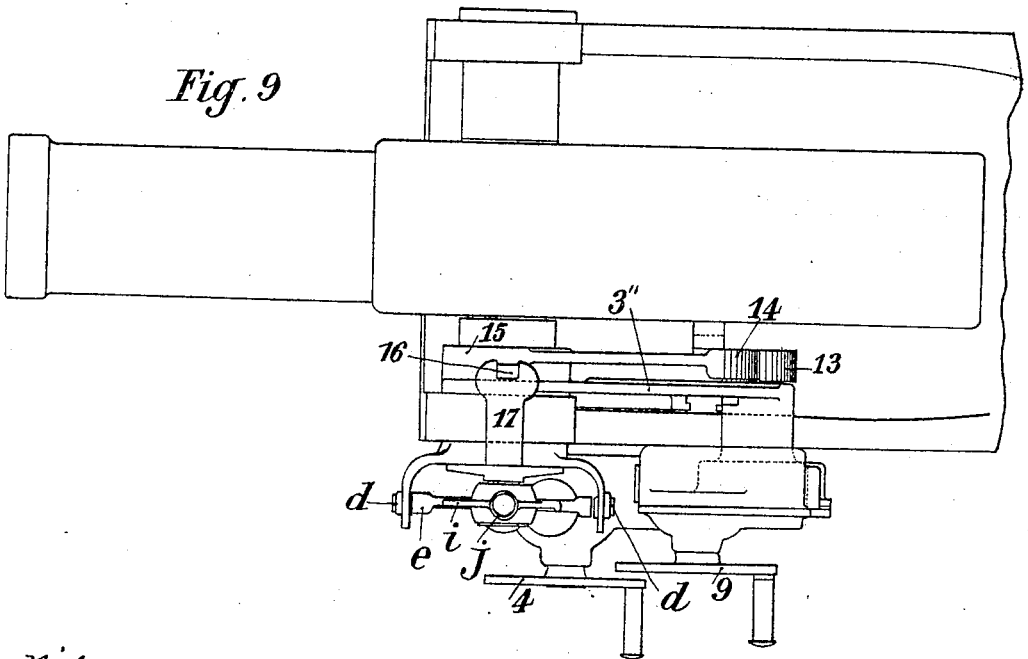

Figures 1, 2, and 3 are respectively an elevation, a plan, and a section on the line A B C, Fig. 1, of one form of the apparatus. Figs. 4, 5, 6, and 7 are respectively an elevation of the complete apparatus, a plan, a section on line A B C D, Fig. 4, and a section on line E F, Fig. 5, of the second form; and Figs. 8, 9, 10, 11, and 12 are respectively an elevation, a plan, a rear view, a vertical section on line E F, Fig. 8, and a horizontal section on line A B C D, Fig. 8, of the third form.

In the example shown by Figs. 1, 2, and 3 the automatic compensator comprises a bracket $a$, directly attached to the gun, preferably integral therewith, the arms $b$ $c$ of which form bearings $d$ $d$ for the pivots of the pendulous support $e$ of the sighting apparatus. The line joining the pivot-bearings $d$ $d$ is parallel to the axis of the gun, and thus forms an axis which is invariable as regards the gun itself and about which the said pendulous support oscillates. The said support comprises a circular frame $e$, having a heavy piece or weight $f$ secured thereto and preferably integral therewith. $g$ $h$ are two sleeves or sockets by means of which the frame is capable of oscillating upon the pins held in the bearings $d$.

In the groove of the frame $e$ there is embedded and adapted to turn a ring $i$, provided with a socket $j$ for the reception of the sighting apparatus proper, $w$, which is indicated by broken lines in Figs. 1 and 3. It may be of any suitable construction similar, say, to that of the apparatus described in the specification of the prior United States Patent No. 716,114, of December 6, 1902.

The ring $i$ has upon a portion of its circumference a rack $k$, whereby it engages with a spiral gear-wheel $l$, housed within a boss $m$ of the frame $e$. By means of a handle $n$ both the wheel $l$ and rack $k$ may be turned to move or adjust the ring $i$ in the frame $e$. Such movement of the said ring enables the range-indicator to be set—$i. e.$, the angle between the line of sight and the axis of the gun to be established. Upon the face of the ring $i$ is engraved a suitable scale $y$. A bevel edge $o$ at the end of the frame $e$ serves as an indicator in reading the scale. For the elevation of the gun elevating mechanism may be used, which in moving the gun also moves the support $a$, and consequently the sighting apparatus proper, $w$.

In a rabbet $z$, Fig. 3, made in the circular frame $e$, a sliding sector $p$ is guided and retained, such sector being provided with rack-teeth $v$, Fig. 1, which may be actuated and locked by means of a toothed plunger $x$, having a spiral gear-wheel similar to wheel $l$, described above, and housed in a boss or projection on the frame $e$. Upon a curved bar $s$, projecting from the sector $p$ and having a curvature of comparatively long radius, there is adapted to slide and to be secured by means of a screw $u$ a level $t$. The sector $p$ is adapted to turn on a journal $q$, centrally disposed on a cross-piece $r$, integral with the frame $e$. It bears a scale divided into degrees corresponding with the pitch of the teeth $v$, the "0" mark on the scale registering with the line X' on the frame $e$. The guide-bar $s$ is graduated in minutes.

It will be understood that with the apparatus described the angle between the vertical plane of the axis of the gun and the vertical plane of the line of sight is always maintained constant by the automatic operation of the compensator. This apparatus enables the following operations to be performed: First, if the range has previously been found by moving the handle $n$ so as to bring the required division of the ring $i$ opposite the guide-mark $o$ of the frame and if, on the other hand, the angle of deviation has been found by means of the sighting apparatus movable within the socket $j$ the gun may be directly trained at the target by operating the sighting mechanism in the usual way; second, the gun may be elevated by means of the level $t$ and be given the required direction (right or left) by means of the sighting apparatus $w$; third, a field-piece which has been trained direct may be adjusted as to elevation by means of the level $t$ and be properly directed by means of the sighting apparatus $w$, or, fourth, a piece may be adjusted by means of the sighting apparatus $w$ alone, first, as to direction, by moving the said sighting apparatus in its socket $j$ and then as to elevation by moving the ring $i$ in the frame $e$.

In the form of apparatus represented in Figs. 4 to 7 the automatic compensator is combined with training mechanism and an independent line of sight. The bracket $a$, provided with two arms 5 6, in which are mounted the pivots 3 4 of the pendulous support $e$, is in this instance secured to a sleeve or socket $b'$, forming part of a toothed sector $c'$, which serves for elevating and depressing the gun. One of the trunnions 7 of the gun is adapted to revolve within the sleeve. Inasmuch as any movement imparted by any appropriate transmission mechanism to the said sector $c'$ causes the gun to turn on its trunnions, it follows that the axis of the gun and the line joining the pivots 3 4 are displaced simultaneously and constantly remain parallel. The pendulous support comprises, as before, a circular frame $e$, carrying the weight $f$. In the interior of this frame there is guided and adapted to turn freely a plate $i'$, carrying a socket 8, in which is fitted the sighting apparatus proper, $w$. It will at once be understood that the variations in the angle of inclination of the trunnions of the gun will cause no variation in the angle comprised between the two vertical planes coinciding, respectively, with the axis of the gun and the line of sight.

In the first-described form of apparatus the movements of the gun in the plane perpendicular to the axial line of the said trunnions caused a displacement of the line of sight. In this second form of apparatus I have made the line of sight independent. Inasmuch as the plate $i'$ is capable of turning freely in the frame $e$, such plate is not moved when the gun is turned about the axis of its trunnions, and besides in order that the line of sight may be controlled independently of the gun I provide a universal joint in the center of the said plate $i'$. The inner ring $d''$ of this joint is fitted on a square portion $g$, that projects from a stirrup 9, secured in its turn to a ring $h'$, which is loose on the sleeve of the bracket $a$, and consequently capable of turning around the gun-trunnion. The said stirrup 9 at its lower part carries a toothed sector $m'$, gearing with an endless screw 20, provided in a bracket $j'$, which projects from the cheek 2 of the gun-carriage. The screw 20 is keyed to a small shaft $k'$, which carries at its end a hand-wheel $l'$ within convenient reach of the gunner. It is clear that this mechanism, which enables the line of sight to be controlled independently of the gun, in no way affects the operation of the automatic compensator. The frame $e$ may in this instance serve as a guide and pivot for a level-bearing sector, such as is designated by the letters *t s p* in the preceding example. To avoid interfering with the clearness of the drawing this sector has not been shown.

It will be seen that the combination of the automatic compensator with the independent arrangement of the line of sight in addition to insuring the constancy of the angle of deviation has the following advantages: First, it permits the line of sight to be directed toward the target without previously finding the requisite elevation, and, second, it enables all the changes which may be necessary in the process of firing to be made without any displacement of the line of sight.

In the form of apparatus shown by Figs. 8 to 12 the automatic compensator is combined with training mechanism having an independent range-indicator. The pendulous support *e f*, oscillating about the pivots *d*, carried by the bracket *a*, is similar to that of the preceding example. It may, as in the construction exemplified in Figs. 1 to 3, be provided with a movable level-bearing sector, and it still forms here a means of guiding and retaining a plate *i*, carrying a socket *j*, in which is fitted the sighting apparatus proper, *w*. In the plate *i* there is provided a universal joint, the central portion of which is mounted on a square piece *g″*, which is attached to the toothed elevating-sector *l″* and is integral with a sleeve or socket 2, Fig. 12, forming a cap for one of the trunnions of the gun and connected to the sector *l″* by an arm 3″. Owing to this connection, the pivot *g″* participates in all the movements of the sector *l″*, and at whatever angle this sector may be inclined in relation to the axis of the gun by the operation of the said sector the plate *i*, and consequently also the line of sight, will be equally inclined. The actuation of the sector *l″* takes place by means of transmission-gearing of any appropriate construction. In the example shown the sector *l″*, guided by the cheek of the gun-carriage, is operated by means of a hand-wheel 4, the rotary motion of which is transmitted, through the medium of pinions and a worm and worm wheel, to a pinion 8. The sector 3 3 carries transmitting mechanism controlled by a hand-wheel 9, which through a pinion 13 is adapted to set in motion a toothed sector 14, mounted on the trunnion by means of a boss 15, Fig. 12. This boss is provided with a pin or stud 16, Figs. 9 and 12, which is fitted in an arm 17, carried by a bracket *a*. By such means any rotary movement imparted to the hand-wheel 9 is transmitted to the sector and through it, owing to the connection 16 17, to the bracket *a*. The elevation of the gun is effected by means of a boss 18, projecting from the sector 14, with the result that the gun may be elevated, no matter whether the hand-wheel 4 or the hand-wheel 9 be actuated for the purpose.

When the hand-wheel 4 is operated, both the gun itself and (owing to the piece *g″*) the plate *i*, with the line of sight, are moved. When, on the contrary, the hand-wheel 9 is operated, the gun and the bracket *a* are moved; but then the bracket turns freely on the sleeve 2″, so that the sighting apparatus remains stationary. Thus the arrangement permits the operation, first, by acting upon the hand-wheel 4 to direct the sighting-line toward the target without altering the elevation; second, by operating the hand-wheel 9 to find or to vary the range without altering the position of the line of sight, or, third, to direct the line of sight toward the target and at the same time to find or vary the elevation.

Having now particularly described and ascertained the nature of my said invention and in what manner the same is to be performed, I declare that what I claim is—

1. In a sighting apparatus for guns, a sighting instrumentality, a circular plate for carrying the same whereby the sight may be adjusted in elevation, a pendulous frame supporting said plate, whereby the latter may oscillate in a vertical plane parallel to the axis of the gun, and means for attaching said frame to a gun.

2. In a sighting apparatus for a gun, a revolubly-supported frame adapted to be maintained in a vertical plane parallel to the axis of the gun, means supporting the same on a gun, a weight attached to said frame whereby the frame is maintained in a vertical plane, a circular plate supported in guides in said frame, a sighting instrumentality carried by said plate, and means for adjusting the plate in a vertical plane parallel to the axis of the gun.

3. In a sighting apparatus for guns, a revolubly-supported frame adapted to be maintained in a vertical plane parallel to the axis of the gun, means supporting the same on a gun, a weight attached to the frame whereby the frame is maintained in a vertical plane, a circular plate supported in guides in said frame adapted to carry a sighting instrumentality, and means for adjusting said plate in a vertical plane parallel to the axis of the gun.

4. In a sighting apparatus for guns, a revolubly-supported frame adapted to be maintained in a vertical plane parallel to the axis of the gun, means supporting the same on a gun, a weight attached to said frame whereby the frame is maintained in a vertical plane, a circular plate supported in guides in said frame, a sighting instrumentality carried by said plate, means for adjusting the plate in a vertical plane parallel to the axis of the gun, a sector pivoted at the center of the said frame and provided with a training-level.

5. In a sighting apparatus for guns, a revolubly-supported frame adapted to be maintained in a vertical plane parallel to the axis of the gun, means supporting the same on a gun, a weight attached to said frame to maintain the same in a vertical plane, a circular graduated plate supported in guides in said frame, a sighting instrumentality carried by said plate, mechanism for adjusting said plate in a vertical plane parallel to the axis of the gun, a sector pivoted at the center of said frame provided with a training-level, and means on the frame for adjusting said sector.

6. In a sighting apparatus for guns, a pendulous frame, a bracket for supporting the same on a gun, the axis of the frame being parallel to the axis of the gun, a weight attached to the frame to maintain the latter in a vertical plane, guides in said frame, a plate in said guides, a support on the plate for a sighting instrumentality, means for adjusting said plate in a vertical plane parallel to the axis of the gun, a pivot located at the center of the frame, a sector on said pivot, guides on the frame for the sector, a training-level on the sector, and adjusting and locking means for the latter.

In witness whereof I have hereunto set my hand in presence of two witnesses.

CHARLES PROSPER EUGÈNE SCHNEIDER.

Witnesses:
EDMOND BLAISE,
JEAN GAMET.